United States Patent [19]
Bang

[11] Patent Number: 6,115,199
[45] Date of Patent: Sep. 5, 2000

[54] CIRCUIT FOR PREVENTING SERVO SECTOR FROM BEING OVERWRITTEN DUE TO MISDETECTION OF A SERVO ADDRESS MARK IN A MAGNETIC DISK

[75] Inventor: Ho-Yul Bang, Suwon, Rep. of Korea

[73] Assignee: SamSung Electronics Co., Ltd., Suwon, Rep. of Korea

[21] Appl. No.: 08/841,602

[22] Filed: Apr. 30, 1997

[30] Foreign Application Priority Data

Apr. 30, 1996 [KR] Rep. of Korea ................. 96-13886

[51] Int. Cl.⁷ .................................................. G11B 5/09
[52] U.S. Cl. .................................................. 360/51; 369/47
[58] Field of Search .............................. 360/51; 369/47, 369/48; 714/770

[56] References Cited

U.S. PATENT DOCUMENTS

| | | |
|---|---|---|
| 4,823,212 | 4/1989 | Knowles et al. . |
| 5,210,660 | 5/1993 | Hetzler . |
| 5,231,545 | 7/1993 | Gold . |
| 5,255,136 | 10/1993 | Machado et al. . |
| 5,384,671 | 1/1995 | Fisher . |
| 5,420,730 | 5/1995 | Moon et al. . |
| 5,442,499 | 8/1995 | Emori . |
| 5,444,685 | 8/1995 | Masood et al. ............... 369/47 |
| 5,517,371 | 5/1996 | Takei . |
| 5,544,135 | 8/1996 | Akin, Jr. et al. . |
| 5,825,568 | 10/1998 | Lee ............................... 360/51 |
| 5,977,472 | 12/1990 | Volz et al. . |

FOREIGN PATENT DOCUMENTS 37 51 744 T2 of 0000 Germany .
195 17 003 11/1995 Germany .

OTHER PUBLICATIONS

Ser. No. 08/884,486 entitled Automatic Servo Address Mark Detection and Servo Timing Compensation Circuit by Bang, the status is pending.

*Primary Examiner*—Andrew L. Sniezek
*Assistant Examiner*—Dan I. Davidson
*Attorney, Agent, or Firm*—Robert E. Bushnell, Esq.

[57] ABSTRACT

A circuit for preventing servo sectors from being overwritten during write operations due to misdetection of servo address mark (SAM) in a disk drive which includes a CPU, a SAM detection circuit for detecting the SAM, a reference pulse generator for generating reference pulses to obtain a servo detection timing in response to a SAM detection signal, a main counter for counting the system clock signals upon receipt the reference pulses, a data sector end pulse generator for generating a data sector end signal, a SAM detection window generator for generating a SAM detection window signal enabled to a window value loaded by the CPU upon receipt of the end signal and a pseudo SAM upon misdetection of the SAM in the SAM detection window signal, a pseudo SAM counter reset by the SAM detection signal for counting the PSAMs provided by the SAM detection window generator to generate a counting pulse when the counted value exceeds a given value, a delay and search flag bit generator for delaying the servo detection timing in response to the counting pulse generated by the PSAM pulse counter to generate a SAM search select signal and a search flag bit transferred to the CPU, and a SAM search mode control circuit for generating a SAM search start signal and disable signal according to the SAM search select signal provided by the delay and search flag bit generator.

18 Claims, 7 Drawing Sheets

CIRCUIT FOR PREVENTING SERVO SECTOR FROM BEING OVERWRITTEN DUE TO MISDETECTION OF A SERVO ADDRESS MARK IN A MAGNETIC DISK

CLAIM FOR PRIORITY

This application makes reference to, incorporates the same herein, and claims all benefits accruing under 35 U.S.C. §119 from an application for CIRCUIT FOR PREVENTING THE SERVO SECTOR FROM BEING OVERWRITTEN OWING TO MISSING THE DETECTION OF A SERVO ADDRESS MARK IN A MAGNETIC DISK earlier filed in the Korean Industrial Property Office on Apr. 30, 1996, and there duly assigned Ser. No. 13886/1996.

BACKGROUND OF THE INVENTION

1. Technical Field

The present invention relates to a disk recording apparatus for magnetically writing or reading digital information, and more particularly, relates to a circuit for controlling timing of correctly detecting servo sectors written onto a magnetic disk.

2. Related Art

Magnetic hard disk drives typically include one or more magnetic disks defining a multiplicity of concentric data tracks. Magnetic disk drives having high data density generally rely upon head position control systems for moving a selected transducer (head) from a departure track to a destination track location during track seeking operations, for settling the head at the vicinity of the destination track during track settling operations, and for following the centerline of the destination track during track following operations when data information is written or read from the disk. Exemplary disk drive architectures having head position control systems using servo information detection are disclosed in U.S. Pat. No. 4,823,212 for Sampled Servo Code Format And System For A Disc Drive issued to Knowles et al., U.S. Pat. No. 5,210,660 for Sectored Servo Independent Of Data Architecture issued to Hetzler, U.S. Pat. No. 5,255,136 for High Capacity Submicro-Winchester Fixed Disk Drive issued to Machado et al., U.S. Pat. No. 5,384,671 for PRML Sampled Data Channel Synchronous Servo Detector issued to Fisher, U.S. Pat. No. 5,515,371 for Track Sector Detection System For Rotating Disk Data Storage Apparatus issued to Takei.

Generally, disk drive designs embed servo head position information within the concentric data tracks of a magnetic disk. This embedded information is usually recorded in evenly spaced apart areas or sectors of the track. The embedded servo information includes servo head position and track/data identification fields, and typically includes a unique servo address markpattern which is provided to resynchronize timers for recovering the servo head position and the track/data identification field information, and which mark in time expected arrival of the next embedded sero sector. As a result, reliable detection of the servo address mark pattern in each servo sector is essential for precisely marking in time not only the servo sector and its positioning information fields, but also the following user data storage area. If a servo address mark (SAM) is corrupted or misdetected, subsequent servo sectors may be overwritten. Recent efforts to ensure reliable detection of servo address mark pattern in a disk drive are disclosed in U.S. Pat. No. 5,420,730 for Servo Data Recovery Circuit For Disk Drive Having Digital Embedded Sector Servo issued to Moon et al., U.S. Pat. No. 5,442,499 for Method Of Detecting Sector Servo Information In A Disk System issued to Emori, and U.S. Pat. No. 5,544,135 for Fault Tolerant Servo Address Mark For Disk Drive issued to Akin, Jr. et al. While the servo data detection techniques of Moon '730, Emori '499 and Akin '135 require sophisticated circuitry and possess their own merits, I have noted however, that further improvements in the servo address mark detection can be made particularly in order to prevent the recorded servo sector information from being destroyed during subsequent write operations.

SUMMARY OF THE INVENTION

Accordingly, it is therefore an object of the present invention to provide a disk recording apparatus having an improved servo address mark detection function.

It is also an object to provide a disk recording apparatus having a servo address mark detection function for detecting a servo address mark (SAM) within a magnetic disk and for preventing servo sectors from being overwritten due to misdetection of the servo address mark.

These and other objects of the present invention can be achieved by a disk recording apparatus having servo pattern detection which prevents servo sectors from being overwritten due to misdetection of a servo address mark (SAM) in a magnetic disk. The disk recording apparatus includes a rotating data storage disk having a plurality of concentric data tracks and servo sectors embedded within the data tracks; a transducer positioned to read data from adata track selected from said concentric data tracks; a CPU for controlling operations of said disk drive and for controlling detection of the servo sectors including the servo address mark contained therein; a servo address mark detector for detecting the servo address mark from data read from the disk and generating therefrom a servo address mark detection signal; a reference pulse generator for generating reference pulses to obtain a servo detection timing in response to the servo address mark detection signal; a main counter for counting system clock signals upon receipt of the reference pulses; a data sector end pulse generator for generating a data sector end signal when a counted value of the main counter reaches a predetermined value loaded by the CPU; a servo address mark detection window generator for generating a servo address mark detection window signal upon receipt of the data sector end signal and generating a pseudo servo address mark signal upon misdetection of the servo address mark during a detection period defined by the servo address mark detection window signal; a pseudo servo address mark signal counter reset by the servo address mark detection signal for counting the pseudo servo address mark signals generated by the servo address mark detection window generator to generate a counting pulse when the counted value exceeds a predetermined value; a delay and search flag bit generator for delaying the servo detection timing in response to the counting pulse to generate a servo address mark search select signal and a search flag bit transferred to the CPU; and a servo address mark search mode controller for generating a servo address mark search start signal and disable signal according to the servo address mark search select signal provided by the delay and search flag bit generator.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
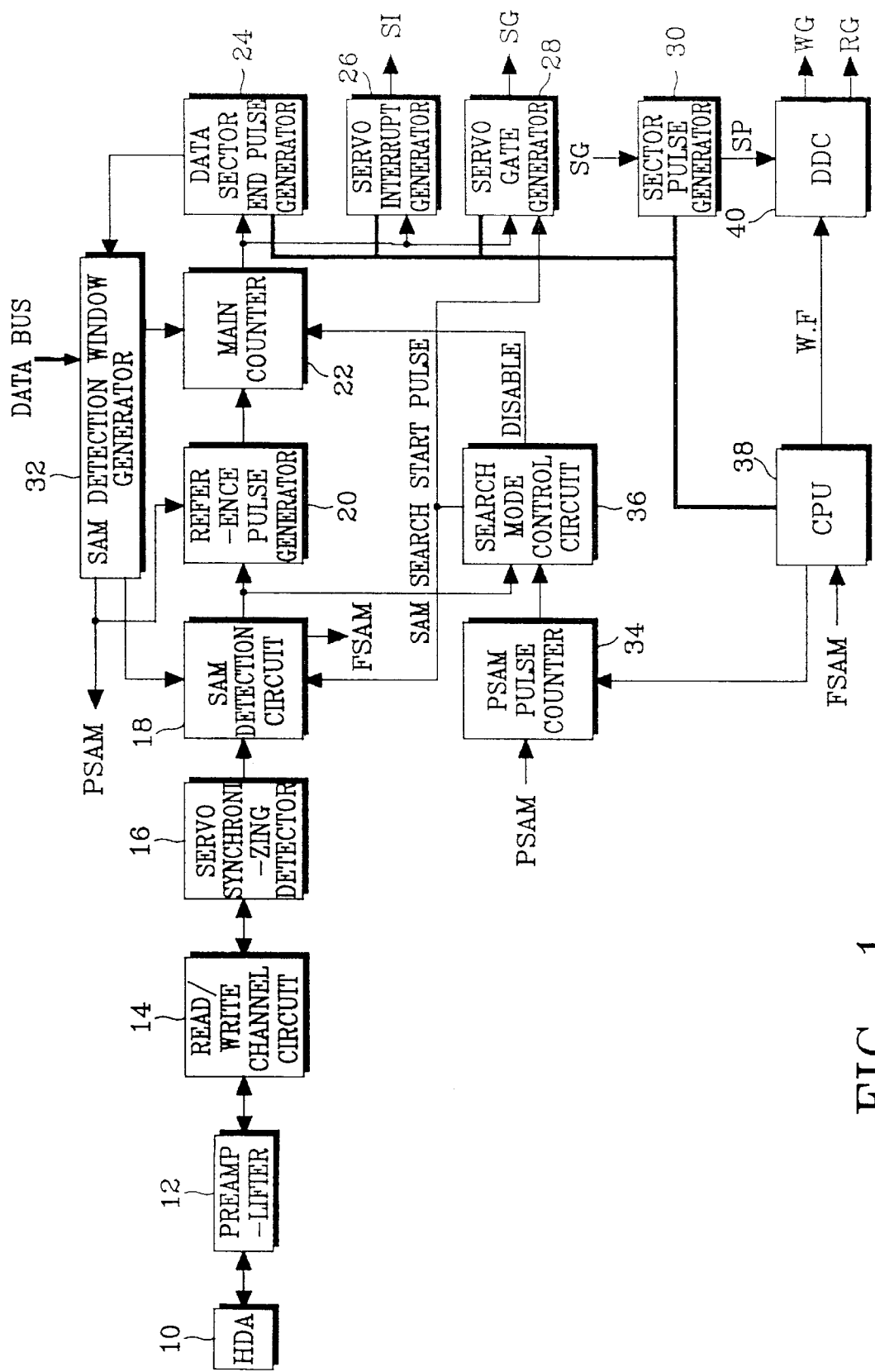
FIG. 1 is a block diagram of a disk recording apparatus.

Refer now to the drawings and particularly to FIG. 1, which illustrates a disk recording apparatus having a servo address mark detection function. This disk recording apparatus includes a head and disk assembly (HDA) 10, a preamplifier 12, a read/write channel circuit 14, a servo synchronizing detector 16, a servo address mark (SAM) detection circuit 18, a reference pulse generator 20, a main counter 22, a data sector end pulse generator 24, a servo interrupt generator 26, a servo gate generator 28, a sector pulse generator 30, a servo address mark (SAM) detection window generator 32, a pseudo-servo address mark (PSAM) pulse counter 34, a search mode control circuit 36, a central processing unit (CPU) 38, a data disk controller (DDC) 40, and a system clock 50.

Additional information concerning servo address mark detection is set forth in U.S. Ser. No. 08/884,486 entitled "Automatic Servo Address Mark Detection and Servo Timing Compensation Circuit." The HDA 10 typically includes a base, a spindle motor formed therein, or fixedly attached to the base, for supporting at least one data storage disk rotated by the spindle motor at a predetermined angular velocity, a voice coil actuator structure including an actuator for positioning a selected transducer (head) among a multiplicity of concentric data tracks formed on each major surface of the disk. The concentric data tracks on each surface of the disk include therein a series of circumferentially spaced apart, embedded servo sectors which are used to provide discrete samples of head positioning and timing information, including a servo address mark which is detected in accordance with the principles of the present invention.

The CPU 38 controls the actuator of the HDA 10 to move the transducer (head) to a particular track on a disk or from a departure track to a destination track on the disk upon receipt of a write command provided by a host computer. The head reads the encoded read data (ERD) representing the particular track, which is transferred to the read/write channel circuit 14 via the preamplifier 12. The read/write channel circuit 14 transfers the ERD to the SAM detection circuit 18 through the servo synchronizing detector 16 for synchronization with a system clock 50. The SAM detection circuit 18 detects a servo address mark or fault servo address mark (FSAM) to recognize the particular pattern of the servo sector, which is synchronized and applied to the reference pulse generator 20 to generate a reference pulse to start the main counter 22. The main counter 22 counts the system clock signals SCLK output from the system clock 50.

The CPU 38 also provides various initial timing signals for the data sector end pulse generator 24, servo interrupt generator 26, SAM detection window generator 32, servo gate generator 28, and sector pulse generator 30, so that each of these signals generates a specific pulse waveform in case the initial timing value meets a given number of the system clock signals counted by the main counter 22. The timing waveforms are shown in FIGS. 2A–2E, 3A–3G, and 4A–4I. More particularly, FIGS. 3A–3G describe the timing waveforms where the servo sectors are correctly detected with normal SAMs, and FIGS. 4A–4I describe the timing waveform where the second and third servo sector are missed during detecting the SAMs.

Figure 2:
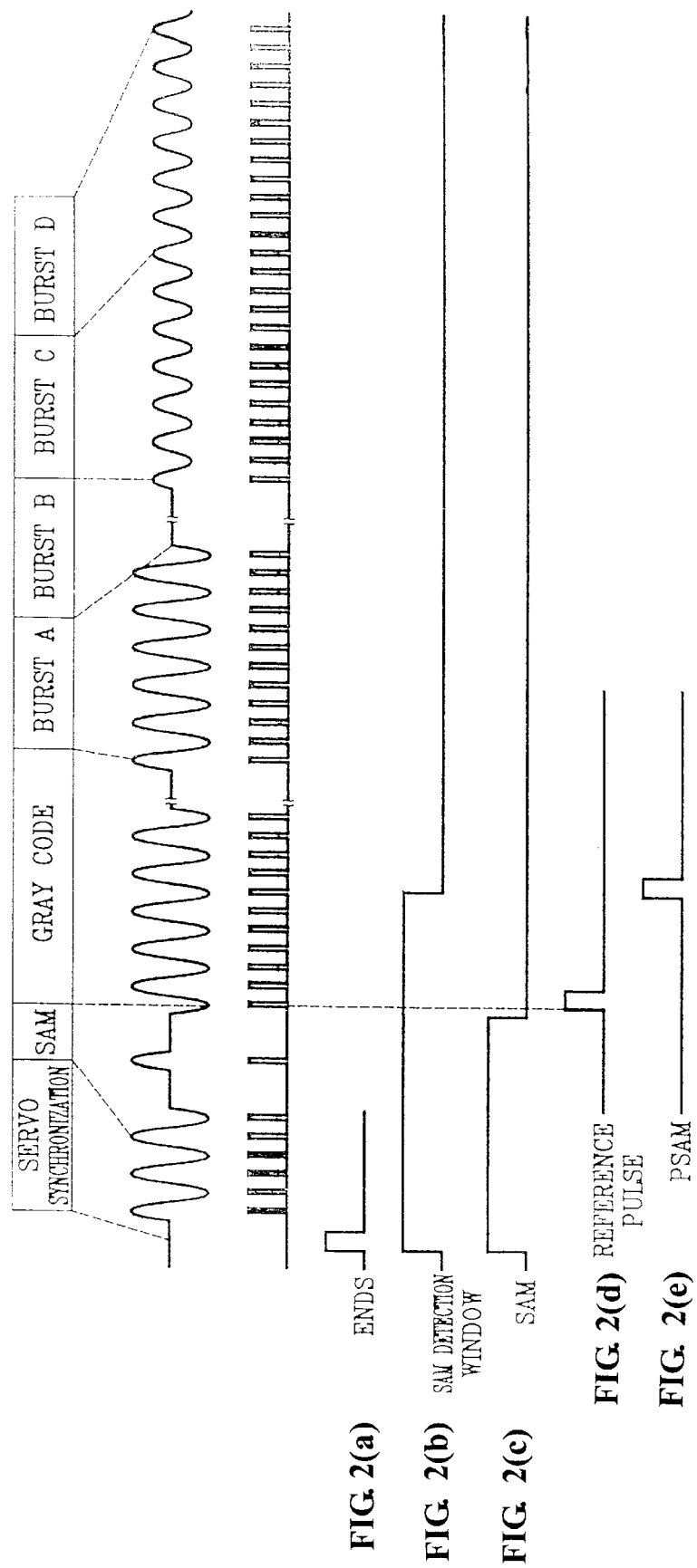
FIG. 2 shows time pulse waveforms of the disk recording apparatus of FIG. 1 for detecting a servo sector in a magnetic disk.
Figure 3:
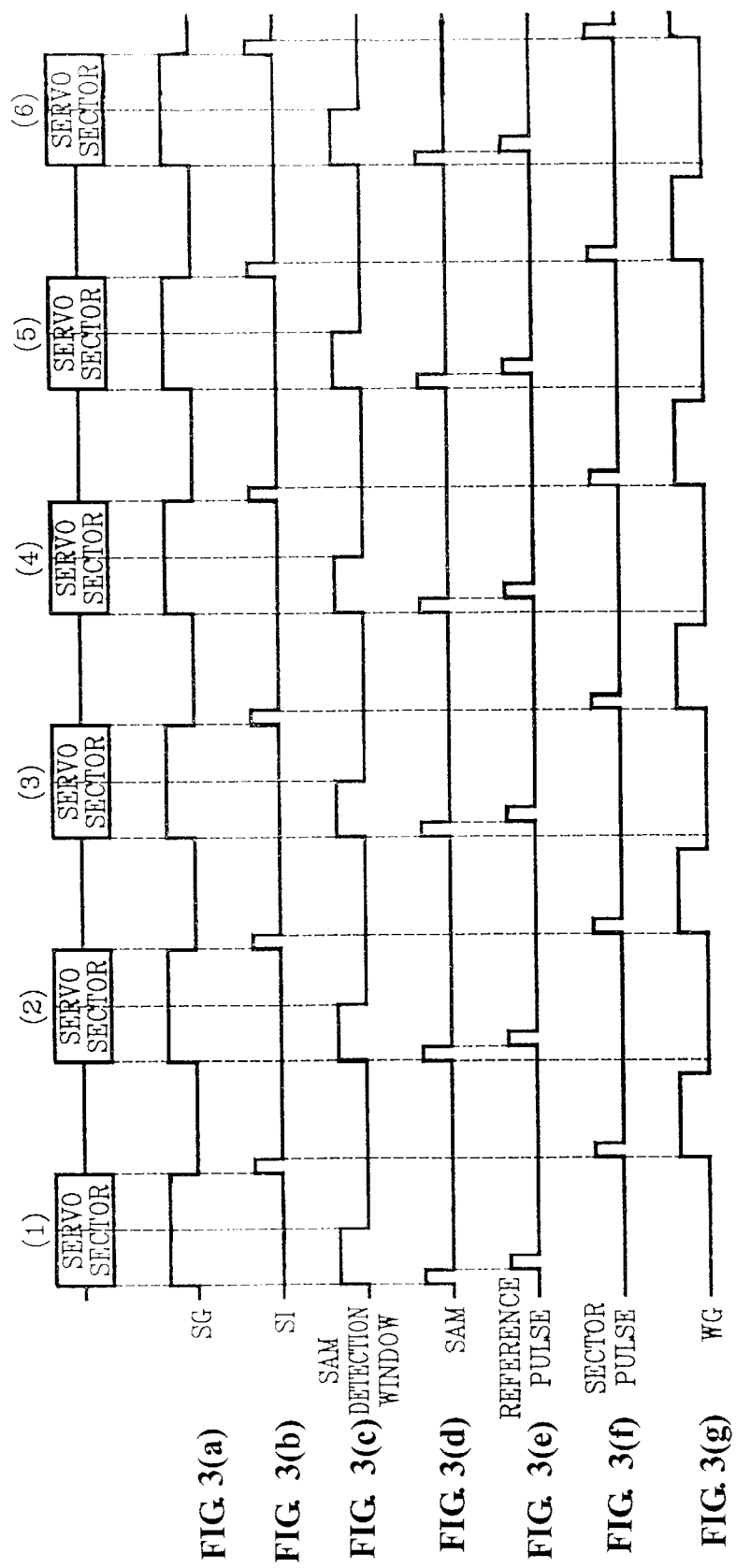
FIG. 3 shows timing pulse waveforms of the disk recording apparatus of FIG. 1 for detecting multiple servo sectors in a magnetic disk.
Figure 4:
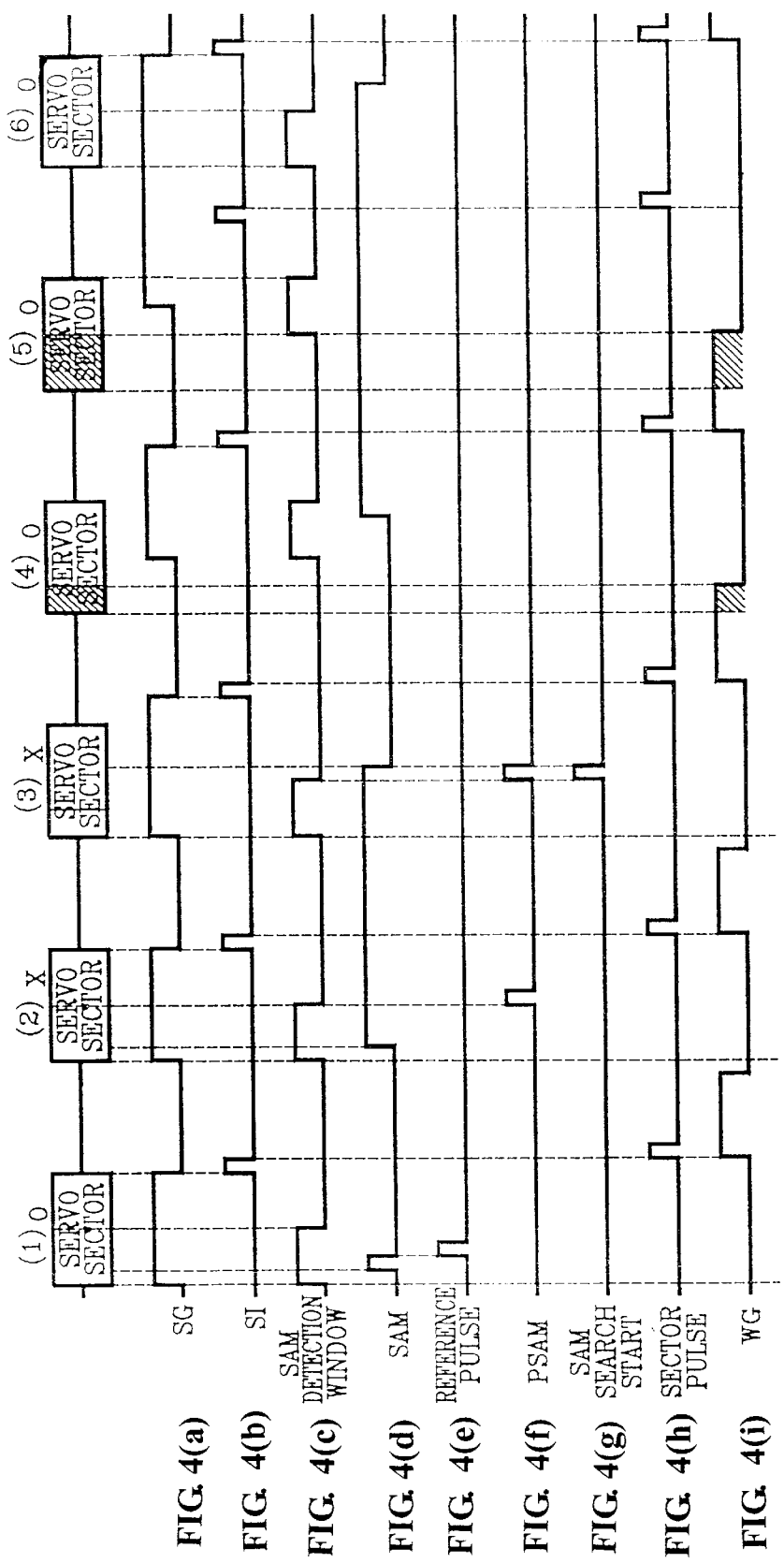
FIG. 4 shows timing pulse waveforms of the disk recording apparatus of FIG. 1 in response to misdetection of the servo sectors in the magnetic disk.

The data sector end pulse generator 24 generates adata sector end pulse at the end of a data sector, as shown by waveform of FIG. 2A, which enables a SAM detection window generator 32. Then, the SAM detection window generator 32 generates a SAM detection window signal, as shown by waveform of FIG. 2B, which is applied to the SAM detection circuit to detect the SAM in the SAM detection window. Detecting the SAM in the detection window, the SAM detection circuit generates a pulse as shown by waveforms of FIG. 2C and FIG. 3D, which is delivered to the reference pulse generator 20 to generate a reference pulse as shown by waveform of FIG. 2D applied to the main counter 22. Hence, a servo gate signal is generated to detect the servo sector, as shown by waveform of FIG. 3A, and a servo sector interrupt signal to represent the end of the servo sector, as shown by waveform of FIG. 3B. Then, the sector pulse generator 30 is synchronized with the servo sector interrupt signal to generate a sector pulse, as shown by waveform of FIG. 3F, which is applied to a disk controller 40 to generate a write gate signal, as shown by waveform of FIG. 3G.

Now, the case is described with reference to FIGS. 4A–4I in which the detection of SAM is missed. When the detection of SAM is missed in the second and third servo sector, the output signal of the SAM detection circuit 18 is maintained at the high level as shown by waveform of FIG. 4D. The output signal, which is called fault servo address mark (FSAM) representing the missed SAM regions, is applied to the CPU 38, which in turn transfers a control signal to the SAM detection window generator 32 to generate a pseudo SAM (PSAM) signal at the end of a SAM window region, as shown by waveform of FIG. 4F. The PSAM is applied to a PSAM signal counter 34. Counting a given number of PSAM signals, the PSAM signal counter generates a counting pulse applied to the SAM search mode control circuit 36, which in turn disables the main counter 22. In addition, the PSAM signal counter 34 generates a SAM search start pulse applied to the SAM detection circuit 18. Detecting the PSAM in the burst interval of the servo sector region, the SAM detection circuit 18 misinterprets it as a SAM so as to drop the output from the high to the low. Thereafter, the SAM detection circuit enables the reference pulse generator 20 to generate reference pulses transferred to the main counter, which generates the various timing signals. However, the generation of the various timing signals is delayed because of the misinterpretation of the SAM detection circuit as described above. In addition, the write signal is also delayed to overwrite the servo sector region.

Figure 5:
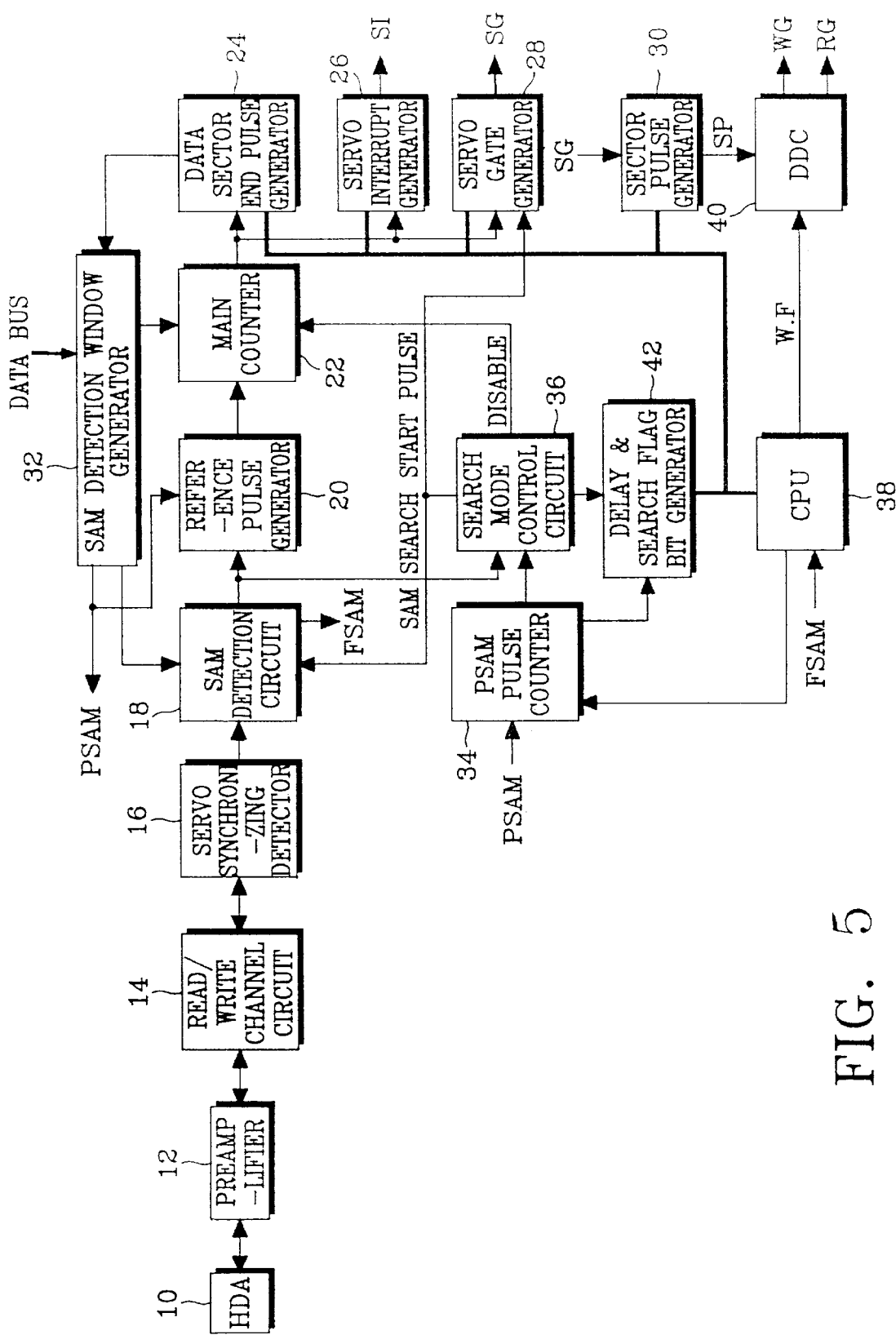
FIG. 5 is a block diagram of a disk recording apparatus having a servo address mark detection function as constructed according to the principles of the present invention.

Turn now to FIG. 5, which illustrates a disk recording apparatus having a servo address mark detection function as constructed according to the principles of the present invention. In addition to a head and disk assembly (HDA) 10, a preamplifier 12, a read/write channel circuit 14, a servo synchronizing detector 16, a servo address mark (SAM) detection circuit 18, a reference pulse generator 20, a main counter 22, a data sector end pulse generator 24, a servo interrupt generator 26, a servo gate generator 28, a sector pulse generator 30, a sector address mark (SAM) detection window generator 32, a pseudo-sector address mark (PSAM) pulse counter 34, a search mode control circuit 36, a central processing unit (CPU) 38, a data disk controller (DDC) 40, and a system clock 50, the disk recording apparatus according to the present invention further includes a delay & search flag bit generator 42 which is especially designed to prevent the servo sector from being overwritten due to misdetection of SAM in the disk.

The CPU 38 controls the actuator of the HDA 10 to move the head to a particular track upon receipt of a write command provided by a host computer. The head reads the encoded read data (ERD) representing the particular track, which is transferred to a read/write channel circuit 14 via the preamplifier 12. The read/write channel circuit 14 transfers the ERD to the SAM detection circuit 18 to establish synchronization with a system clock 50. The SAM detection circuit 18 detects a servo address mark or fault servo address mark (FSAM) to recognize a particular pattern of the servo sector, which is synchronized and applied to the reference pulse generator 20 to generate a reference pulse to start a counting operation of the main counter 22. The main counter 22 counts the system clock signals SCLK output from the system clock 50.

The CPU 38 provides various initial timing values for the data sector end pulse generator 24, servo interrupt generator 26, SAM detection window generator 32, servo gate generator 28, and sector pulse generator 30, so that each of these values generates a specific pulse waveform in case the initial timing value meets a given number of the reference pulses counted by the main counter 22. The timing waveforms are shown in FIGS. 6A–6J, where the second and third servo sectors are missed during detection of the SAMs. The data sector end pulse generator 24 generates a data sects end pulse at the end of a data sector which enables operation of the SAM detection window generator 32.

Figure 6:
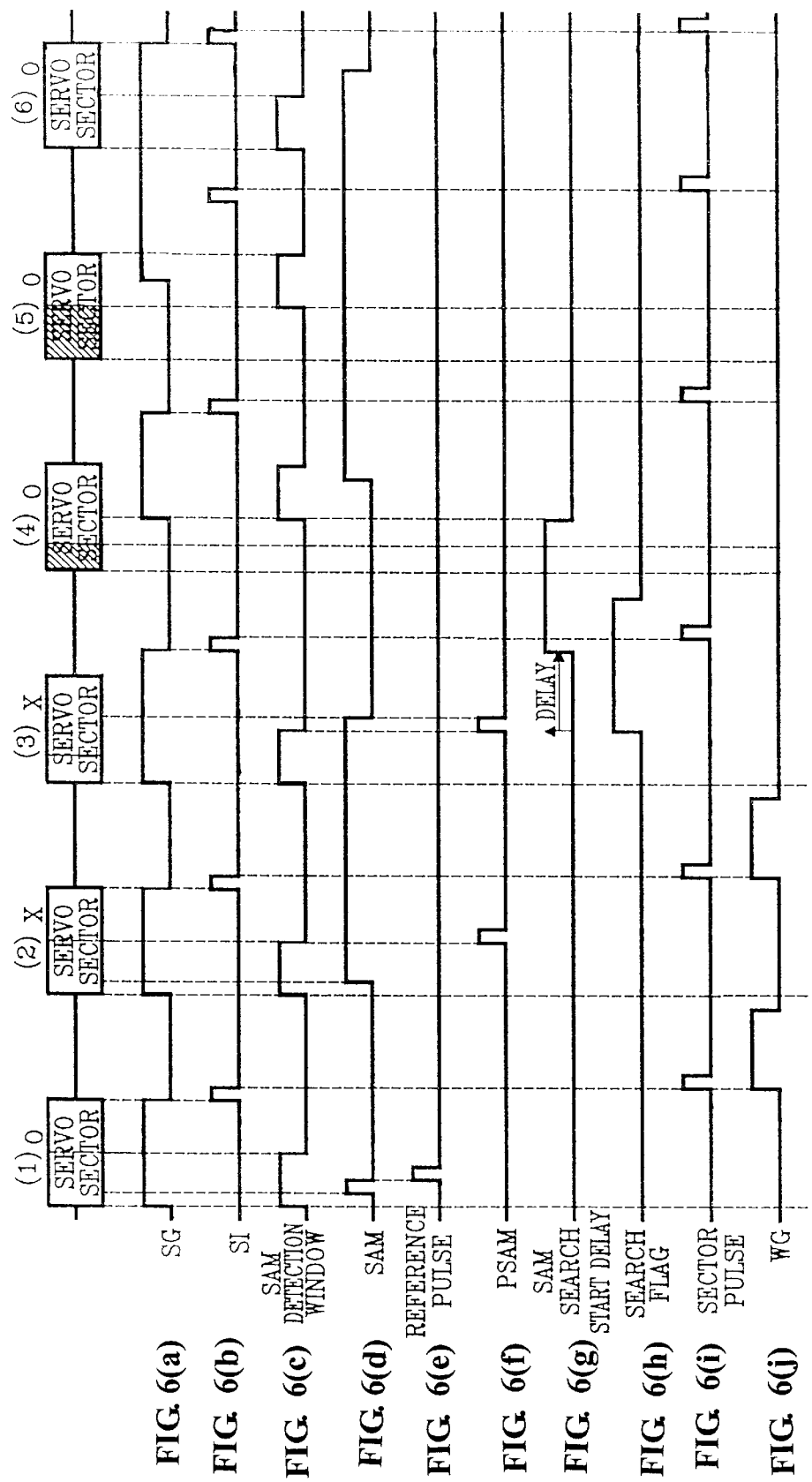
FIG. 6 shows timing pulse waveforms for detecting multiple servo sectors in a magnetic disk according to the principles of the present invention.

Then, the SAM detection window generator 32 generates a SAM detection window signal to detect the SAM of the first servo sector, as shown by waveform of FIG. 6C. The SAM detection window signal is applied to the SAM detection circuit 18 to detect the SAM during the SAM detection window. Upon detection of the SAM in the detection window, the SAM detection circuit generates the pulse as shown by waveform of FIG. 6D, which is delivered to the reference pulse generator 20 to generate a reference pulse as shown by waveform of FIG. 6E applied to the main counter 22.

Meanwhile, the servo interrupt generator 26 generates a servo interrupt pulse as the servo gate signal is dropped from high to the low, as shown by waveform of FIG. 6B. Being synchronized with the servo interrupt pulse, the sector pulse generator 30 generates a sector pulse SP to represent the end of the servo sector. The sector pulse is applied to the disk controller 40 to generate a write gate signal WG, as shown by waveform of FIG. 6J.

Subsequently, as the data sector end pulse generator 24 generates a data sector end pulse, the SAM detection window generator 32 generates a second SAM detection window of the servo sector having the waveform, as shown by waveform of FIG. 6C, which is applied to the SAM detection circuit 18. Upon misdetection of SAM in the second SAM detection window, the SAM detection circuit 18 generates an FSAM applied to the CPU 38, as shown by waveform of FIG. 6D. Then, the CPU 38 is synchronized with the end of the SAM detection window signal to control the SAM detection window generator 32 to generate a PSAM signal applied to the PSAM signal counter 34, so that there is produced an effect similar to a SAM.

The servo interrupt generator 26 generates a servo interrupt pulse when the servo gate signal is dropped from high to the low as shown by waveform of FIG. 6B. In synchronization with the servo interrupt pulse, the sector pulse generator 30 generates a sector pulse SP to represent the end of the servo sector, as shown by waveform of FIG. 6I. The sector pulse is applied to the disk controller 40 to generate a write gate signal WG, as shown by waveform of FIG. 6J. Thereafter, as the data sector end pulse generator 24 generates a data sector end pulse, the SAM detection window generator 32 generates a third SAM detection window of the servo sector having the waveform, as shown in FIG. 6C, which is applied to the SAM detection circuit 18. Again upon misdetection of the SAM in the second SAM detection window, the SAM detection circuit 18 generates an FSAM applied to the CPU 38, as shown by waveform of FIG. 6D. Then, the CPU 38 is synchronized with the end of the SAM detection window signal to control the SAM detection window generator 32 to generate a PSAM signal applied to the PSAM signal counter 34.

After detecting the PSAM signal twice in sequence, the PSAM signal counter 34 generates a counting pulse delayed by the delay and search flag bit generator 42 to compare the pulse with the synchronization position of the next servo sector calculated by the CPU 38. If the delayed pulse corresponds to the synchronization position of the next servo sector, the delay and search flag bit generator 42 causes the SAM search mode control circuit 36 to apply a SAM search start signal delayed as shown by waveform of FIG. 6G to the SAM detection circuit 18 and to disable the main counter 22, so that various synchronizing signals are generated in order to detect the SAM of the next servo sector. Further, the delay and search flag bit generator 42 generates a search flag bit applied to the CPU 38, which in turn applies a write fault signal WF to the disk controller 40 to prevent the next servo sector from being overwritten during write operations. Subsequently, the disk controller 40 disables the write gate to wait the next servo interrupt signal in order to retry the writing operation upon occurrence of the FSAM and PSAM.

Figure 7:
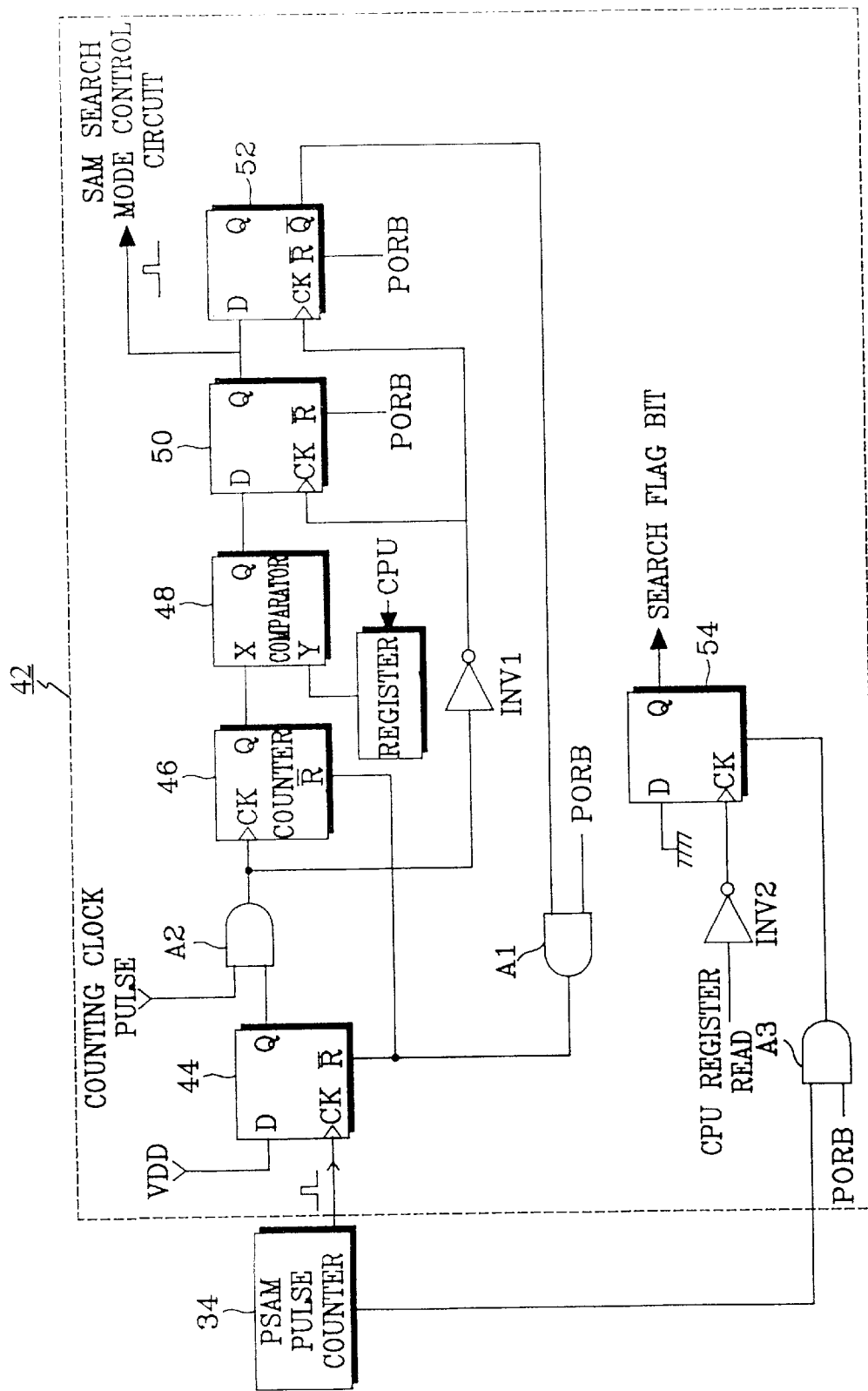
FIG. 7 is a block diagram of a delay and search flag generator used in the disk recording apparatus constructed according to the principles of the present invention.

Refer now to FIG. 7 which illustrates the construction of the delay and search flag bit generator 42 of the disk recording apparatus constructed according to the principles of the present invention. As shown in FIG. 7, the output of the PSAM pulse counter 34 is applied to the clock terminal of a first D flip-flop 44, so that the high signal of a voltage source applied to the D input terminal is latched to the output terminal Q. Then, the high signal is applied as one input of an AND gate A2 with the other input receiving the counting clock pulse (system clock pulse). Counting the output pulse of the AND gate A2, the counter 46 delivers the counted value to an input terminal X of a comparator 48. Applied to the other input terminal Y of the comparator 48 is the value of the synchronization position registered initially once in a register REG A by the CPU 38. When the values of both inputs X, Y are equal, the comparator 48 generates a signal applied to a second D flip-flop 50.

Then, the second D flip-flop 50 is synchronized with the counting clock pulse from the AND gate A2 to generate a signal applied to the SAM search mode control circuit 36 and a third D flip-flop 52. The third D flip-flop 52 is synchronized with the counting clock pulse applied to the clock terminal CK from the AND gate A2 through an inverter INV1 to generate an output signal through the output terminal $\overline{Q}$. The output signal is applied to an AND gate A1 to generate a reset signal applied to the reset terminal $\overline{R}$ of the first D flip-flop 44 and to the counter 46.

Furthermore, the counting pulse of the PSAM pulse counter 34 is applied to an AND gate A3 to generate a signal applied to the preset terminal of a fourth D flip-flop 54 to produce a high signal called a search flag bit. When the CPU 38 supplies a read pulse to the clock terminal CK of the fourth D flip-flop in order to read the signal transferred to the SAM search mode control circuit 36, the search flag bit is dropped from high to low, and applied to the CPU 38.

As described above, the present invention advantageously provides a delay and search flag generator in a disk recording apparatus for preventing the burst interval of the servo sectors from being misinterpreted as the SAM due to misdetection of the SAM of the servo sector in a magnetic disk in order to prevent the servo sectors from being overwritten during write operations.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A circuit preventing servo sectors in a magnetic disk from being overwritten due to misdetection of a servo address mark in a disk drive including a rotating data storage disk having a plurality of concentric data tracks and servo sectors embedded within the data tracks, and a transducer positioned to read data from a data track selected from said concentric data tracks, said circuit comprising:

a controller controlling operations of said disk drive and controlling detection of the servo sectors including the servo address mark contained therein;

a servo address mark detector detecting the servo address mark from data read from the disk and generating therefrom a servo address mark detection signal;

a reference pulse generator generating reference pulses to obtain servo detection timing in response to the servo address mark detection signal;

a system clock outputting system clock signals;

a main counter counting system clock signals upon receipt of said reference pulses;

a data sector end pulse generator generating a data sector end signal when a number of system clock signals counted by said main counter reaches a first predetermined value loaded by said controller;

a servo address mark detection window generator generating a servo address mark detection window signal upon receipt of said data sector end signal and generating a pseudo servo address mark signal upon misdetection of the servo address mark during a detection period defined by said servo address mark detection window signal;

a pseudo servo address mark pulse counter reset by said servo address mark detection signal counting the pseudo servo address mark signals generated by said servo address mark detection window generator to generate a counting pulse when a number of system clock signals counted by said main counter exceeds a second predetermined value;

a delay and search flag bit generator generating, in response to the counting pulse, a servo address mark search select signal for delayings said servo detection timing and generating a search flag bit transferred to said controller; and a servo address mark search mode controller generating a servo address mark search start signal and disable signal according to said servo address mark search select signal provided by said delay and search flag bit generator, said disable signal being received by said main counter, said servo address mark search start signal being received by said servo address mark detector.

2. The circuit of claim 1, said delay and search flag bit generator comprising:

a first latch circuit clocked by a rising edge of said counting pulse provided by said pseudo servo address mark pulse counter latching an input signal;

an AND gate logically combining an output signal of said first latch circuit and a clock signal;

a secondary counter counting the clock signal delivered from said AND gate;

a comparator comparing a counted value of said secondary counter and the value of said servo detection timing provided by said controller;

a second latch circuit latching an output of said comparator to generate an output signal to said servo address mark search mode controller and a reset signal to said first latch circuit and said secondary counter; and a third latch circuit generating said search flag bit of high level in synchronism with the rising edge of said counting pulse of low level delivered from said pseudo servo address mark pulse counter in synchronism with the disable signal of said search controller.

3. The circuit of claim 1, said delay and search flag bit generator comprising:

a first flip flop having a clock terminal coupled to receive said counting pulse supplied from said pseudo servo address mark pulse counter, a data terminal coupled to receive an input signal from a voltage source, and an output terminal producing a first flip-flop signal that is latched from the input signal;

a first AND gate logically combining the first flip-flop signal and a clock pulse and generating therefrom a first clock signal;

a secondary counter counting the first clock signal from said first AND gate, and generating therefrom a counted value;

a comparator comparing the counted value of said secondary counter and a value of said servo detection timing provided by said controller, and generating therefrom a comparator value;

a second flip-flop having a clock terminal coupled to receive an invert of said first clock signal, a data terminal coupled to receive said comparator value, and an output terminal producing a second flip-flop signal that is latched from said comparator value to said servo address mark search mode controller;

a third flip-flop having a clock terminal coupled to receive said invert of said first clock signal, a data terminal coupled to receive said second flip-flop signal, and an output terminal generating a reset signal to reset operation of said first flip-flop and said secondary counter; and a fourth flip-flop generating said search flag bit of high level in synchronism with the rising edge of said counting pulse of low level delivered from said pseudo servo address mark pulse counter in synchronism with the disable signal of said search controller.

4. The circuit of claim 1, said delay and search flag bit generator comprising:

a first unit clocked by a rising edge of said counting pulse provided by said pseudo servo address mark pulse counter latching an input signal;

a second unit combining an output signal of said first unit and a clock signal;

a secondary counter counting the clock signal delivered from said second unit;

a comparator comparing a counted value of said secondary counter and the value of said servo detection timing provided by said controller;

a third unit latching an output of said comparator to generate an output signal to said servo address mark search mode controller and a reset signal to said first unit and said secondary counter; and a fourth unit generating said search flag bit of high level in synchronism with the rising edge of said counting pulse of low level delivered from said pseudo servo address mark pulse counter in synchronism with the disable signal of said search controller.

5. The circuit of claim 1, said delay and search flag bit generator comprising:

a first unit having a clock terminal coupled to receive said counting pulse supplied from said pseudo servo address mark pulse counter, a data terminal coupled to receive an input signal from a voltage source, and an output terminal producing a first flip-flop signal that is latched from the input signal;

a second unit combining the first flip-flop signal and a clock pulse and generating therefrom a first clock signal;

a secondary counter counting the first clock signal from said second unit, and generating therefrom a counted value;

a comparator comparing the counted value of said secondary counter and a value of said servo detection timing provided by said controller, and generating therefrom a comparator value;

a third unit having a clock terminal coupled to receive an invert of said first clock signal, a data terminal coupled to receive said comparator value, and an output terminal producing a second flip-flop signal that is latched from said comparator value to said servo address mark search mode controller;

a fourth unit having a clock terminal coupled to receive said invert of said first clock signal, a data terminal coupled to receive said second flip-flop signal, and an output terminal generating a reset signal to reset operation of said first unit and said secondary counter; and a fifth unit generating said search flag bit of high level in synchronism with the rising edge of said counting pulse of low level delivered from said pseudo servo address mark pulse counter in synchronism with the disable signal of said search controller.

6. An apparatus, comprising:

a main circuit preventing servo sectors in a magnetic disk from being overwritten due to misdetection of a servo address mark in a disk drive including a rotating data storage disk having a plurality of concentric data tracks and servo sectors embedded within the data tracks, and a transducer positioned to read data from a data track selected from said concentric data tracks, said main circuit further comprising:

a controller controlling operations of said disk drive and controlling detection of the servo sectors including the servo address mark contained therein;

a detector detecting the servo address mark from data read from the disk and generating therefrom a first detection signal;

a first generator generating reference pulses to obtain servo detection timing in response to said first detection signal;

a system outputting system clock signals;

a main counter counting system clock signals upon receipt of said reference pulses;

a pseudo pulse counter reset by said first detection signal generating a counting pulse when a number of system clock signals counted by said main counter exceeds a secondary predetermined value;

a delay and search flag bit generator generating, in response to the counting pulse, a servo address mark search select signal for delaying said servo detection timing and generating a search flag bit transferred to said controller; and a search controller generating a search start signal according to said servo address mark search select signal provided by said delay and search flag bit generator, said search start signal being received by said detector.

7. The apparatus of claim 6, further comprising:

a second generator generating a data sector end signal when a number of system clock signals counted by said main counter reaches a primary predetermined value loaded by said controller; and a window generator generating a window signal upon receipt of said data sector end signal and generating a pseudo servo address mark signal upon misdetection of the servo address mark during a detection period defined by said window signal.

8. The apparatus of claim 7, further comprising said pseudo pulse counter, reset by said first detection signal, counting the pseudo servo address mark signals generated by said window generator to generate said counting pulse when a number of system clock signals counted by said main counter exceeds the secondary predetermined value.

9. The apparatus of claim 8, further comprising said search controller generating a disable signal according to said servo address mark search select signal provided by said delay and search flag bit generator, said disable signal being received by said main counter.

10. The apparatus of claim 9, said delay and search flag bit generator comprising:

a first latch circuit clocked by a rising edge of said counting pulse provided by said pseudo pulse counter latching an input signal;

an AND gate logically combining an output signal of said first latch circuit and a clock signal;

a secondary counter counting the clock signal delivered from said AND gate;

a comparator comparing a counted value of said secondary counter and the value of said servo detection timing provided by said controller;

a second latch circuit latching an output of said comparator to generate an output signal to said search controller and a reset signal to said first latch circuit and said secondary counter; and a third latch circuit generating said search flag bit of high level in synchronism with the rising edge of said counting pulse of low level delivered from said pseudo pulse counter in synchronism with the disable signal of said search controller.

11. The apparatus of claim 9, said delay and search flag bit generator comprising:

a first flip flop having a clock terminal coupled to receive said counting pulse supplied from said pseudo pulse counter, a data terminal coupled to receive an input signal from a voltage source, and an output terminal producing a first flip-flop signal that is latched from the input signal;

a first AND gate logically combining the first flip-flop signal and a clock signal and generating therefrom a first clock signal;

a secondary counter counting the first clock signal from said first AND gate, and generating therefrom a counted value;

a comparator comparing the counted value of said secondary counter and a value of said servo detection timing provided by said controller, and generating therefrom a comparator value;

a second flip-flop having a clock terminal coupled to receive an invert of said first clock signal, a data terminal coupled to receive said comparator value, and an output terminal producing a second flip-flop signal that is latched from said comparator value to said search controller;

a third flip-flop having a clock terminal coupled to receive said invert of said first clock signal, a data terminal coupled to receive said second flip-flop signal, and an output terminal generating a reset signal to reset operation of said first flip-flop and said secondary counter; and a fourth flip-flop generating said search flag bit of high level in synchronism with the rising edge of said counting pulse of low level delivered from said pseudo pulse counter in synchronism with the disable signal of said search controller.

12. The apparatus of claim 9, said delay and search flag bit generator comprising:

a first unit clocked by a rising edge of said counting pulse provided by said pseudo pulse counter latching an input signal;

a second unit combining an output signal of said first unit and a clock signal;

a secondary counter counting the clock signal delivered from said second unit;

a comparator comparing a counted value of said secondary counter and the value of said servo detection timing provided by said controller;

a third unit latching an output of said comparator to generate an output signal to said search controller and a reset signal to said first unit and said secondary counter; and a fourth unit generating said search flag bit of high level in synchronism with the rising edge of said counting pulse of low level delivered from said pseudo pulse counter in synchronism with the disable signal of said search controller.

13. The apparatus of claim 9, said delay and search flag bit generator comprising:

a first unit having a clock terminal coupled to receive said counting pulse supplied from said pseudo pulse counter, a data terminal coupled to receive an input signal from a voltage source, and an output terminal producing a first flip-flop signal that is latched from the input signal;

a second unit combining the first flip-flop signal and a clock pulse and generating therefrom a first clock signal;

a secondary counter counting the first clock signal from said second unit, and generating therefrom a counted value;

a comparator comparing the counted value of said secondary counter and a value of said servo detection timing provided by said controller, and generating therefrom a comparator value;

a third unit having a clock terminal coupled to receive an invert of said first clock signal, a data terminal coupled to receive said comparator value, and an output terminal producing a second flip-flop signal that is latched from said comparator value to said search controller;

a fourth unit having a clock terminal coupled to receive said invert of said first clock signal, a data terminal coupled to receive said second flip-flop signal, and an output terminal generating a reset signal to reset operation of said first unit and said secondary counter; and a fifth unit generating said search flag bit of high level in synchronism with the rising edge of said counting pulse of low level delivered from said pseudo pulse counter in synchronism with the disable signal of said search controller.

14. An apparatus, comprising:

an electrical circuit preventing servo sectors in a magnetic disk from being overwritten due to misdetection of a servo address mark in a disk drive including a rotating data storage disk having a plurality of concentric data tracks and servo sectors embedded within the data tracks, and a transducer positioned to read data from a data track selected from said concentric data tracks, said electrical circuit further comprising:

a controller controlling operations of said disk drive and controlling detection of the servo sectors including the servo address mark contained therein;

a detector detecting the servo address mark from data read from the disk and generating therefrom a first detection signal;

a first generator generating reference pulses to obtain servo detection timing in response to said first detection signal;

a main counter counting system clock signals upon receipt of said reference pulses;

a system clock outputting said system clock signals to said main counter;

a second generator generating a data sector end signal when a number of system clock signals counted by said main counter reaches a first predetermined value loaded by said controller;

a window generator generating a window signal upon receipt of said data sector end signal and generating a pseudo servo address mark signal upon misdetection of the servo address mark during a detection period defined by said window signal;

a pseudo pulse counter reset by said first detection signal counting the pseudo servo address mark signals generated by said window generator to generate a counting pulse when a number of system clock signals counted by said main counter exceeds a second predetermined value;

a delay and search flag bit generator generating, in response to the counting pulse, a servo address mark search select signal for delaying said servo detection timing and generating a search flag bit transferred to said controller; and a search controller generating a search start signal and disable signal according to said servo address mark search select signal provided by said delay and search flag bit generator, said disable signal being received by said main counter, said search start signal being received by said detector.

15. The apparatus of claim 14, said delay and search flag bit generator comprising:

a first latch circuit clocked by a rising edge of said counting pulse provided by said pseudo pulse counter latching an input signal;

an AND gate logically combining an output signal of said first latch circuit and a clock signal;

a secondary counter counting the clock signal delivered from said AND gate;

a comparator comparing a counted value of said secondary counter and the value of said servo detection timing provided by said controller;

a second latch circuit latching an output of said comparator to generate an output signal to said search controller and a reset signal to said first latch circuit and said secondary counter; and a third latch circuit generating said search flag bit of high level in synchronism with the rising edge of said counting pulse of low level delivered from said pseudo pulse counter in synchronism with the disable signal of said search controller.

16. The apparatus of claim 14, said delay and search flag bit generator comprising:

a first flip flop having a clock terminal coupled to receive said counting pulse supplied from said pseudo pulse counter, a data terminal coupled to receive an input signal from a voltage source, and an output terminal producing a first flip-flop signal that is latched from the input signal;

a first AND gate logically combining the first flip-flop signal and a clock pulse and generating therefrom a first clock signal;

a secondary counter counting the first clock signal from said first AND gate, and generating therefrom a counted value;

a comparator comparing the counted value of said secondary counter and a value of said servo detection timing provided by said controller, and generating therefrom a comparator value;

a second flip-flop having a clock terminal coupled to receive an invert of said first clock signal, a data terminal coupled to receive said comparator value, and an output terminal producing a second flip-flop signal that is latched from said comparator value to said search controller;

a third flip-flop having a clock terminal coupled to receive said invert of said first clock signal, a data terminal coupled to receive said second flip-flop signal, and an output terminal generating a reset signal to reset operation of said first flip-flop and said secondary counter; and a fourth flip-flop generating said search flag bit of high level in synchronism with the rising edge of said counting pulse of low level delivered from said pseudo pulse counter in synchronism with the disable signal of said search controller.

17. The apparatus of claim 14, said delay and search flag bit generator comprising:

a first unit clocked by a rising edge of said counting pulse provided by said pseudo pulse counter latching an input signal;

a second unit combining an output signal of said first unit and a clock signal;

a secondary counter counting the clock signal delivered from said second unit;

a comparator comparing a counted value of said secondary counter and the value of said servo detection timing provided by said controller;

a third unit latching an output of said comparator to generate an output signal to said search controller and a reset signal to said first unit and said secondary counter; and a fourth unit generating said search flag bit of high level in synchronism with the rising edge of said counting pulse of low level delivered from said pseudo pulse counter in synchronism with the disable signal of said search controller.

18. The apparatus of claim 14, said delay and search flag bit generator comprising:

a first unit having a clock terminal coupled to receive said counting pulse supplied from said pseudo pulse counter, a data terminal coupled to receive an input signal from a voltage source, and an output terminal producing a first flip-flop signal that is latched from the input signal;

a second unit combining the first flip-flop signal and a clock pulse and generating therefrom a first clock signal;

a secondary counter counting the first clock signal from said second unit, and generating therefrom a counted value;

a comparator comparing the counted value of said secondary counter and a value of said servo detection timing provided by said controller, and generating therefrom a comparator value;

a third unit having a clock terminal coupled to receive an invert of said first clock signal, a data terminal coupled to receive said comparator value, and an output terminal producing a second flip-flop signal that is latched from said comparator value to said search controller;

a fourth unit having a clock terminal coupled to receive said invert of said first clock signal, a data terminal coupled to receive said second flip-flop signal, and an output terminal generating a reset signal to reset operation of said first unit and said secondary counter; and a fifth unit generating said search flag bit of high level in synchronism with the rising edge of said counting pulse of low level delivered from said pseudo pulse counter in synchronism with the disable signal of said search controller.

* * * * *